United States Patent [19]

Takeda et al.

[11] Patent Number: 4,884,789
[45] Date of Patent: Dec. 5, 1989

[54] POWER UNIT MOUNTING DEVICE

[75] Inventors: Masaru Takeda, Tokyo; Toshiyuki Tabata, Sagamihara, both of Japan

[73] Assignee: Nissan Motor Co. Ltd., Japan

[21] Appl. No.: 290,298

[22] Filed: Dec. 27, 1988

[30] Foreign Application Priority Data

Dec. 28, 1987 [JP] Japan ................................ 62-335469

[51] Int. Cl.$^4$ .......................... B60K 5/12; F16F 13/00
[52] U.S. Cl. ................................ 267/140.1; 267/219; 267/141.2
[58] Field of Search ....... 267/140.1, 219, 141.2–141.7; 180/300, 312, 902; 248/562, 636, 638

[56] References Cited

U.S. PATENT DOCUMENTS

| | | | |
|---|---|---|---|
| 4,690,389 | 9/1987 | West | 267/140.1 |
| 4,693,456 | 9/1987 | Kanda | 267/140.1 |
| 4,705,410 | 11/1987 | Broock | 267/140.1 X |
| 4,728,086 | 3/1988 | Ishiyama et al. | 267/140.1 |
| 4,749,173 | 6/1988 | Kanda | 267/140.1 |
| 4,756,514 | 7/1988 | Kanda | 267/140.1 |
| 4,763,884 | 8/1988 | Matsui et al. | 267/140.1 |
| 4,768,760 | 9/1988 | LeFol | 267/140.1 |
| 4,809,799 | 3/1989 | Ozaki et al. | 180/312 X |

Primary Examiner—Douglas C. Butler
Attorney, Agent, or Firm—Leydig, Voit & Mayer

[57] ABSTRACT

Disclosed herein is a fluid-filled mounting device which comprises an inner cylindrical member; an outer cylindrical case surrounding the inner cylindrical member; a cylindrical elastomer block disposed between the inner cylindrical member and the outer cylindrical case; a structure defining in the elastomer block a main recess; a structure defining in the elastomer block a deformable chamber at a portion diametrically opposite to the portion where the main recess is defined, the deformable chamber having an outer wall which includes first and second diaphragms, the first diaphragm having a spring constant different from that of the second diaphragm; an annular hollow structure disposed about the elastomer block in a manner to cover the main recess and the first and second diaphragms, thereby to define a main fluid chamber by the main recess, a first auxiliary fluid chamber by the first diaphragm and the annular hollow structure and a second auxiliary fluid chamber by the second diaphragm and the annular hollow structure; a first flow restricting path defined by the annular hollow structure for fluid communication between the main fluid chamber and the first auxiliary fluid chamber; and a second flow restricting path defined by the annular hollow structure for fluid communication between the main fluid chamber and the second auxiliary fluid chamber.

8 Claims, 2 Drawing Sheets

POWER UNIT MOUNTING DEVICE

BACKGROUND OF THE INVENTION

1. Field of the Invention

The present invention relates in general to mounting devices for mounting a power unit on a body of a motor vehicle, and particularly to mounting devices of a type which includes an inner member, an outer case surrounding the inner member and an elastomer block resiliently disposed between the inner member and the outer case. More specifically, the present invention is concerned with mounting devices of a fluid-filled type which has in the elastomer block a fluid-filled chamber for damping a vibration of the elastomeric member.

2. Description of the Prior Art

Hitherto, a so-called fluid-filled type mounting device has been proposed and put into a practical use for its marked vibration damping effect. The mounting device of this type comprises generally an outer cylindrical case secured to a vehicle body (or power unit), an inner cylindrical member received in the outer case and secured to the power unit (or vehicle body), an elastomer block resiliently disposed between the outer case and the inner member, and fluid chambers defined by the elastomer block and communicated through a flow restricting passage. In response to resilient deformation of the elastomer block due to vibration of the power unit, the fluid in one of the fluid chambers is forced to flow to the other through the flow restricting passage damping vibration of the elastomer block transmitted thereto from the power unit.

In order to clarify the task of the present invention, one of the mounting devices of this type hitherto proposed by the same applicants will be outlined with reference to FIGS. 6 and 7 of the accompanying drawings, which is disclosed in Japanese Patent Application 62-1429.

As shown in the drawings, the mounting device 1 comprises an outer cylindrical case 4, an inner cylindrical member 3, a cylindrical elastomer block 5 disposed between the outer case 4 and the inner member 3. A main fluid chamber 2 is defined in one side of the elastomer block 5, a first auxiliary fluid chamber 6a is defined at a diametrically opposed side of the main chamber 2, and a second auxiliary fluid chamber 6b is defined near the main fluid chamber 2, as shown.

Each of the auxiliary chambers 6a and 6b is partially defined by a diaphragm 7 whose spring constant is controllable independent of the elastomer block 5. The main fluid chamber 2 communicates with the first auxiliary fluid chamber 6a through flow restricting passages 8 and 8 each extending circularly around the elastomer block 5, and the main fluid chamber 2 communicates with the second auxiliary fluid chamber 6b through an orifice 9d. It has been revealed that the provision of the two auxiliary fluid chambers 6a and 6b provides the mounting device 1 with a vibration damping characteristic with which the shaking of the engine and the idling vibration of the same are both damped by a satisfied degree at the same time.

However, the mounting device 1 as described hereinabove has a very complicated construction. In fact, as is shown in the drawings, the main fluid chamber 2 is provided by tightly disposing a rectangular box structure 9 in a mouth portion of a blind bore formed in the elastomer block 5. Each of the flow restricting passages 8 and 8 comprises an opening 9a formed in the box structure 9, an orifice 9b or 9c formed in the box structure 9 and an elongate passsage 8a or 8b extending circularly around the elastomer block 5. The orifice 9d communicating the main fluid chamber 2 and the second auxiliary fluid chamber 6b is formed in the box structure 9 also.

A semicylindrical structure 8c which partially defines the elongate passages 8a and 8b is divided into two parts at the position where the box structure 9 is positioned. The first auxiliary fluid chamber 6a is defined by the diaphragm 7 and a part of the semicylindrical structure 8c, while the second auxiliary fluid chamber 6b is defined by the other diaphragm 7 and the box structure 9.

The second auxiliary fluid chamber 6b is communicated with the main fluid chamber 2 through the orifice 9d and the elongate passage 8b which turns about two times about the elastomer block 5. Accordingly, as is seen from FIG. 7, there is a need of providing the semicylindrical structure 8c with three grooves 8b, 8b and 8a.

As is known, complicated construction of the mounting device 1 induces not only increase in production cost but also increase in malfunction possibility.

SUMMARY OF THE INVENTION

It is therefore an object of the present invention to provide an improved mounting device of fluid-filled type, which is free of the above-mentioned drawbacks.

According to the present invention, there is provided a fluid-filled mounting device which comprises an inner cylindrical member; and outer cylindrical case surrounding the inner cylindrical member; a cylindrical elastomer block disposed between the inner cylindrical member and the outer cylindrical case; means defining in the elastomer block a main recess; means defining in the elastomer block a deformable chamber at a portion diametrically opposite to the portion where the main recess is defined, the deformable chamber having an outer wall which includes first and second diaphragms, the first diaphragm having a spring constant different from that of the second diaphragm; an annular hollow structure disposed about the elastomer block in a manner to cover the main recess and the first and second diaphragms, thereby to define a main fluid chamber by the main recess, a first auxiliary fluid chamber by the first diaphragm and the annular hollow structure and a second auxiliary fluid chamber by the second diaphragm and the annular hollow structure; a first flow restricting path defined by the annular hollow structure for fluid communication between the main fluid chamber and the first auxiliary fluid chamber; and a second flow restricting path defined by the annular hollow structure for fluid communication between the main fluid chamber and the second auxiliary fluid chamber.

BRIEF DESCRIPTION OF THE DRAWINGS

Other objects of the present invention will become apparent from the folowing description when taken in conjunction with the accompanying drawings, in which.

DETAILED DESCRIPTION OF THE INVENTION

In the following, a mounting device 10 according to the present invention will be described in detail with reference to FIGS. 1 to 5.

Figure 1:
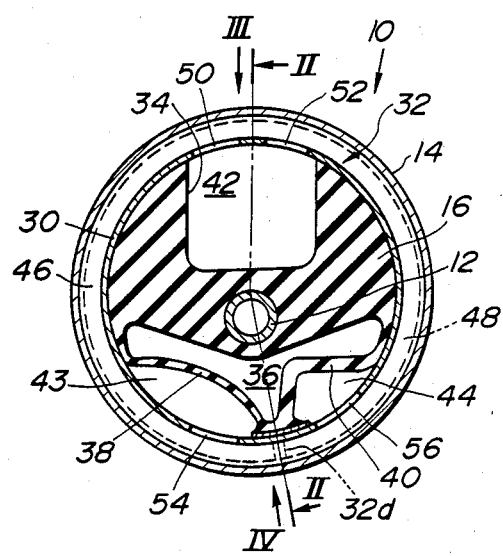
FIG. 1 is a sectional view of a mounting device according to the present invention.
Figure 2:
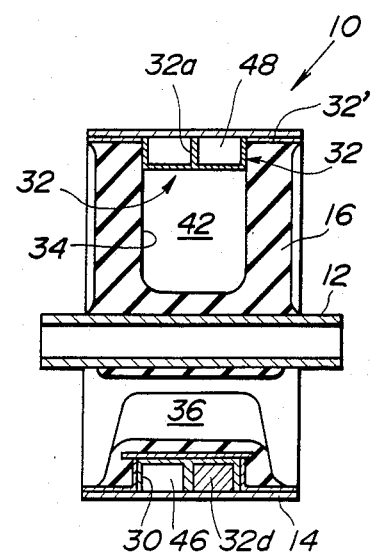
FIG. 2 is a sectional view taken along the line II—II of FIG. 1.

Referring to FIGS. 1 to 4, particularly FIGS. 1 and 2, there is shown the mounting device 10 of the present invention.

The mounting device 10 comprises generally an inner cylindrical member 12, an outer cylindrical case 14 surrounding the inner member 12 and a cylindrical elastomer block 16, constructed of, for example, a rubber material, resiliently disposed between the inner member 12 and the outer case 14.

Figure 5:
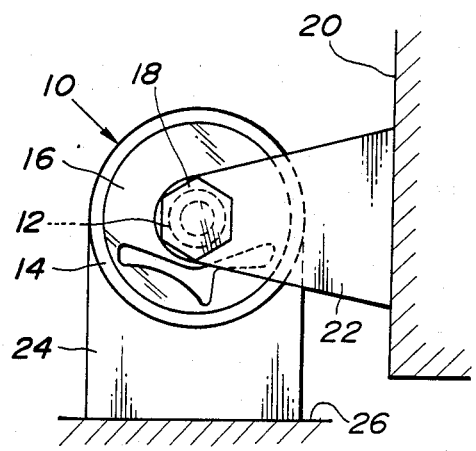
FIG. 5 is a schematic illustration showing the mounting device in practical use.
Figure 6:
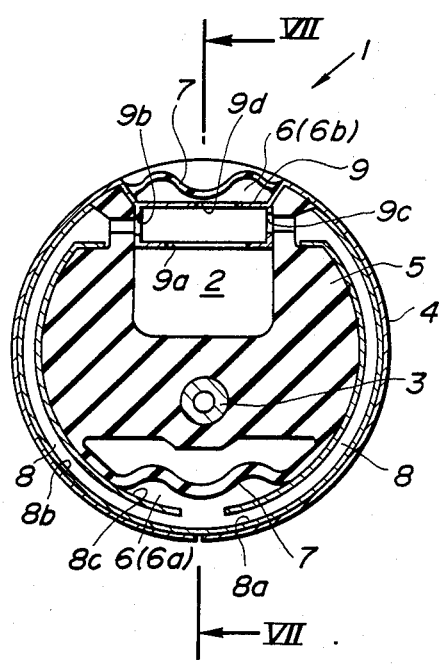
FIG. 6 is a view similar to FIG. 1, but showing a mounting device which has been proposed by the same applicants.
Figure 7:
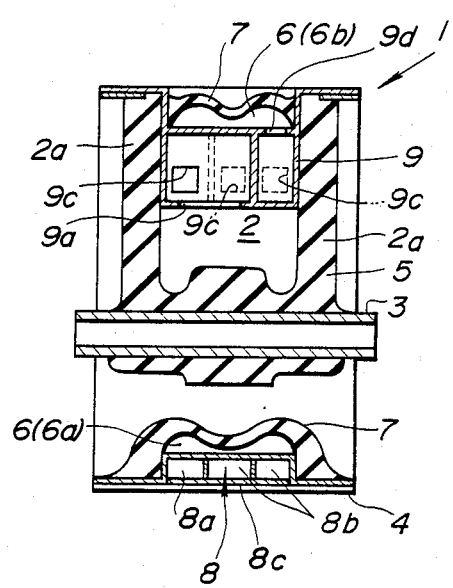
FIG. 7 is a sectional view taken along the line VII—VII of FIG. 6.

As is seen from FIG. 5, in practical use, the inner cylindrical member 12 is connected to a power unit 20. More specifically, the inner member 12 is connected to a bracket 22 of the power unit 20 through a bolt 18 which passes through the inner member 12. The outer cylindrical case 14 is connected through a bracket 24 to a vehicle body 26. Thus, the weight of the power unit 20 is supported by the vehicle body 26 through the elastomer block 16 installed in the mounting device 10.

Figure 3:
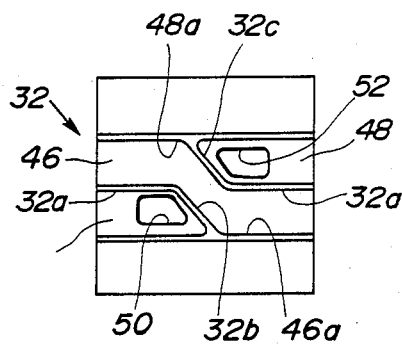
FIG. 3 is a view of an essential part taken from the direction of the arrow III of FIG. 1, with an outer cylindrical case removed.

As is seen from FIGS. 1 and 3, the cylindrical elastomer block 16 is formed thereabout with an annular groove 30.

An annular structure 32, which formes flow restricting passages as will become apparent hereinafter, is coaxially disposed in a radially outer portion of the annular groove 30. The annular structure 32 has an enlarged cylindrical outer base part 32' intimately interposed between an outer cylindrical surface of the elastomer block 16 and an inner cylindrical surface of the outer case 14.

A part of the bottom of the annular groove 30 is depressed toward the center of the elastomer block 16 to form an enlarged recess 34 which serves as a main fluid chamber 42. That is, the enlarged recess 34 is covered with the annular structure 32.

As is best seen from FIG. 1, the elastomer block 16 is formed, at a portion diametrically opposite to the enlarged recess 34, with a deformable chamber 36 whose outer portion is defined by first and second diaphragms 38 and 40 which are integral with the elastomer block 16. If desired, the diaphragms 38 and 40 may be constructed of a separate member.

It is to be noted that the first and second diaphragms 38 and 40 are so arranged not to be directly affected by the weight of the power unit 20.

The first diaphragm 40 and the annular 32 define therebetween a first auxiliary fluid chamber 43, while the second diaphragm 40 and the annular structure 32 define therebetween a second auxiliary fluid chamber 44.

As is seen from FIG. 2, the annular structure 32 is of a hollow member which extends around the annular groove 30 of the elastomer block 16. In the illustrated embodiment, the hollow annular structure 32 has a rectangular cross section.

An annular partition wall 32a is coaxially disposed in the annular structure 32 to divide the interior of the structure 32 into a first annular passage 46 and a second annular passage 48 which extend in parallel about the annular groove 30.

As is seen from FIGS. 1 and 3, the first and second annular passages 46 and 48 are provided at portions facing the main fluid chamber 42 with respective openings 50 and 52, so that both the first and second annular passages 46 and 48 are communicated with the main fluid chamber 42 through the openings 50 and 52 respectively.

As is seen from FIG. 3, respective terminal ends 46a and 48a of the first and second annular passages 46 and 48 are joined by means of parallel partition walls 32b and 32c which extend obliquely between the openings 50 and 52.

Figure 4:
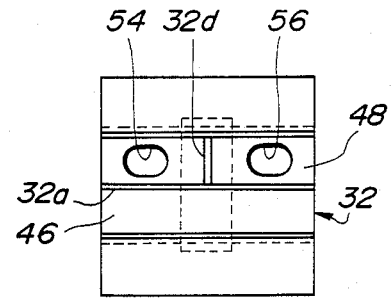
FIG. 4 is a view of the essential part taken from the direction of the arrow IV of FIG. 1, with the outer cylindrical case removed.

As is seen from FIG. 4, the second annular passage 48 is provided at respective portions facing the first and second auxiliary fluid chambers 43 and 44 with openings 54 and 56. A partition wall 32d is disposed in the first annular passage 48 at a position between the two openings 54 and 56.

With this, there are produced two, or longer and shorter flow restricting paths, the longer path including the entire of the first annular passage 46 and a half of the second annular passage 48, while the shorter path including the other half of the second annular passage 48. It is thus to be noted that the longer flow restricting path extends between the main fluid chamber 42 and the first auxiliary fluid chamber 43, while, the shorter path extends between the main fluid chamber 42 and the second auxiliary fluid chamber 44.

As is understood from FIG. 1, the first diaphragm 38 is constructed relatively thin to have a smaller spring constant, while the second diaphragm 40 is constructed relatively thick to have a larger spring constant.

When, in operation, due to vibration of the power unit 20, the inner cylindrical member 12 and the outer cylindrical case 14 of the mounting device 10 are subjected to a mutual displacement, the elastomer block 16 is resiliently deformed changing the volume of the main fluid chamber 42.

Thus, the fluid in the longer and shorter flow restricting paths is forced to flow forward and backward between the main fluid chamber 42 and each of the first and second auxiliary fluid chambers 43 and 44. Thus, the fluid in the paths is forced to resonate in accordance with the expansion resiliency of the main fluid chamber 42, the mass of the fluid in the longer and shorter flow restricting paths and the expansion resiliencies of the first and second auxiliary fluid chambers 43 and 44. This phenomenon damps the vibration of the elastomer block 16.

In the disclosed embodiment, the system including the longer flow restricting path and the first auxiliary fluid chamber 43 is set to resonate with a vibration produced when the engine is shaking, while the other system including the shorter flow restricting path and the second auxiliary fluid chamber 44 is set to resonate with a vibration produced when the engine is idling. Usually, the vibration caused by the engine idling is higher in frequency than that caused by the engine shaking.

Accordingly, the vibration caused by the engine shaking and the engine idling are effectively damped by the mounting device 10.

As will be understood from the foregoing description, in accordance with the present invention, the main fluid chamber 42 and the first and second auxiliary fluid chambers 43 and 44 are arranged at the portions which are circularly spaced from one another. Thus, communication between the main fluid chamber 42 and each auxiliary fluid chamber 43 or 44 is achieved by only using the annular hollow structure 32 which is quite simple in construction. The longer and shorter flow restricting paths are made by slightly modifying the two identical parallel annular passages 46 and 48.

Thus, the mounting device 10 of the present invention is simple construction and can be made with a reduced cost.

Because the recess 34 formed in the elastomer block 16 can be used as the main fluid chamber 42 without reducing the size of the same, the vibration damping effect against a high frequency zone is not lowered.

It has been revealed that making the diaphragm 38 of the first auxiliary fluid chamber 43 thinner than the other diaphragm 40 of the second auxiliary fluid chamber 44 brings about a marked damping effect possessed by the mounting device 10 of the invention.

What is claimed is:

1. A fluid-filled mounting device comprising:
   an inner cylindrical member;
   an outer cylindrical case surrounding said inner cylindrical member;
   a cylindrical elastomer block disposed between said inner cylindrical member and said outer cylindrical case;
   means defining in said elastomer block a main recess;
   means defining in said elastomer block a deformable chamber at a portion diametrically opposite to the portion where said main recess is defined, said deformable chamber having an outer wall which includes first and second diaphragms, said first diaphragm having a spring constant different from that of said second diaphragm;
   an annular hollow structure disposed about said elastomer block in a manner to cover said main recess and said first and second diaphragms, thereby to define a main fluid chamber by said main recess, a first auxiliary fluid chamber by said first diaphragm and said annular hollow structure and a second auxiliary fluid chamber by said second diaphragm and said annular hollow structure;
   a first flow restricting path defined by said annular hollow structure for fluid communication between said main fluid chamber and said first auxiliary fluid chamber; and
   a second flow restricting path defined by said annular hollow structure for fluid communication between said main fluid chamber and said second auxiliary fluid chamber.

2. A fluid-filled mounting device as claimed in claim 1, in which the spring constant of said first diaphragm is smaller than that of said second diaphragm, and in which said first flow restricting path is longer than said second flow restricting path.

3. A fluid-filled mounting device as claimed in claim 2, in which said first diaphragm is constructed thinner than said second diaphragm.

4. A fluid-filled mounting device as claimed in claim 3, in which said annular hollow structure forms therein first and second identical parallel annular passages which constitute said first and second flow restricting paths.

5. A fluid-filled mounting device as claimed in claim 4, in which said first flow restricting path consists of the entire of said first annular passage and a half of said second annular passage, and in which said second flow restricting path consists of the other half of said second annular passage.

6. A fluid-filled mounting device as claimed in claim 5, in which said first and second annular passages have respective openings exposed to said main fluid chamber, in which respective terminal ends of said first and second annular passages are joined to each other by means of a short path which extends obliquely between said openings, in which said second annular passage has two openings exposed to said first and second auxiliary fluid chambers respectively, and in which a partition wall is disposed in said second annular passage at a position between said two openings.

7. A fluid-filled mounting device as claimed in claim 6, in which said first and second diaphragms are integral with said cylindrical elastomer block.

8. A fluid-filled mounting device as claimed in claim 7, in which said cylindrical elastomer block is formed about the cylindrical outer surface with an annular groove in which said annular hollow structure is coaxially is tightly disposed.

* * * * *